2,992,235
MATERIALS HAVING VITAMIN E ACTIVITY
Joseph Green, London, and Stefan Zbigniew Marcinkiewicz, Tooting, London, England, assignors to Vitamins Limited, Hammersmith, London, England, a British company
No Drawing. Filed Oct. 4, 1957, Ser. No. 688,150
Claims priority, application Great Britain Oct. 15, 1956
4 Claims. (Cl. 260—345.5)

This invention relates to materials having vitamin E activity and to a process for their preparation.

Vitamin E is now known to comprise a group of seven natural substances which have been named tocopherols. These substances are, chemically, closely related and are found, individually or together, in vegetable oils such as wheat germ oil, cottonseed oil, corn oil, soybean oil, barley oil and rice oil. No known natural oil contains all seven tocopherols. Chemically, the tocopherols are substituted chromans, containing a phenolic hydroxy group in the 6-position of the nucleus and are methylated to different degrees. The following general Formula I includes all the tocopherols:

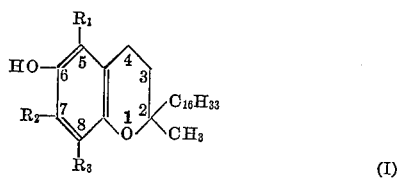

The tocopherols may be regarded as products of methylation of a parent compound, 2-methyl-2-(4,8,12-trimethyltridecyl)-6-chromanol, named tocol (Formula I, where $R_1=R_2=R_3=H$). Then in Formula I α-Tocopherol has $R_1=R_2=R_3=CH_3$
β-Tocopherol has $R_1=R_3=CH_3:R_2=H$
γ-Tocopherol has $R_2=R_3=CH_3:R_1=H$
δ-Tocopherol has $R_3=CH_3:R_1=R_2=H$
ε-Tocopherol has $R_1=CH_3:R_2=R_3=H$
ζ-Tocopherol has $R_1=R_2=CH_3:R_3=H$
η-Tocopherol has $R_2=CH_3:R_1=R_3=H$ Alternatively, α-tocopherol is 5,7,8-trimethyltocol, β-tocopherol is 5,8-dimethyltocol, γ-tocopherol is 7,8-dimethyltocol, δ-tocopherol is 8-methyltocol, ε-tocopherol is 5-methyltocol, ζ-tocopherol is 5,7-dimethyltocol and η-tocopherol is 7-methyltocol. Until recently, only four tocopherols were known to occur in nature. The three latter tocopherols have been isolated and their structure given only in recent years and they complete the total number of tocopherols theoretically possible by methylation of the tocol nucleus. ε-Tocopherol was isolated by Eggitt and Ward (J. Sci. Fd. Agric., 1953, 4, 561), ζ-tocopherol by Green, Marcinkiewicz and Watt (J. Sci. Fd. Agric., 1955, 5, 274), and η-tocopherol by Green and Marcinkiewicz (Nature, 1956, 176, 86).

The vitamin E biological activity of these seven tocopherols differs very markedly. Thus, α-tocopherol has the highest degree of activity and we have found in a series of biological tests that ζ-tocopherol has about half the biological activity of α-tocopherol. β-Tocopherol has some appreciable activity, but the remaining four tocopherols are very low in vitamin E potency. Thus δ-tocopherol has only a hundredth of the potency of α-tocopherol. Since most naturally occurring oils produced industrially in appreciable quantities contain mainly non-α-tocopherols, and since large amounts of natural vitamin E are required for human, medicinal and animal feeding purposes, it has been necessary to invent methods of converting non-α-tocopherols into tocopherols of higher biological potency, and in particular, α-tocopherols.

British Patent No. 629,649 described, for the first time, methods of converting γ-tocopherol to α-tocopherol by conventional methods of methylation, known in the literature to be capable of introducing an alkyl group into a benzene nucleus containing an hydroxyl group. These methods were all variations of normal haloalkylation in which the γ-tocopherol was reacted with an aldehyde (or compound capable of forming an aldehyde) in the presence of a halogen halide. Using formaldehyde and hydrochloric acid, γ-tocopherol was converted to a 5-chlormethyl derivative, which was subsequently reduced to α-tocopherol by methods known in the art. All these known methods of haloalkylation are reviewed in Organic Reactions, vol. I, p. 63, 1942.

British Patent No. 639,011 extends the methods used above to the conversion of β- and δ-tocopherols, and also claims the conversion of non-α-tocopherol esters to α-tocopherol esters. ε-, ζ- and η-tocopherols were unknown at the dates of these specifications, i.e. April 23, 1945, and July 19, 1946.

British Patent Nos. 676,853, 681,507 and 681,508 describe further methods of converting β-, γ- or δ-tocopherols (or their esters) to α-tocopherol (or its esters) by conventional methods of hydroxyalkylation, iminoalkylation, cyanalkylation and the like.

The object of the present invention is to convert low potency tocopherols to tocopherols of enhanced vitamin E activity: in particular to convert non-α-tocopherols to α-tocopherol. A further object is to convert ε- and η-tocopherols to α-tocopherol and to ζ-tocopherol. A further object is to carry out these convertions in high yield, without appreciable destruction of the tocopherol material.

It is well known that methods of alkylation of the benzene nucleus, apart from a very few exceptions, give only poor or moderate yields of the required product. Phenols particularly give bad yields owing to rapid polymerisation under the reaction conditions to give diarylmethane derivatives and further condensation products. In the specifications referred to above, conversion yields appear to be uniformly low. Although some of the examples given render it very difficult to judge the yields, in no case do such yields appear to exceed 60–70%. Often the yields appear to be much less. It should be borne in mind that until comparatively recently, the proportion of individual tocopherols in a mixture could not be determined satisfactorily, and it is likely that yields previously claimed for the conversion of tocopherols could be seriously in error. It is now possible to determine individual tocopherols in a mixture with a high degree of accuracy by using a two-dimensional paper-chromatographic technique (Green, Marcinkiewicz and Watt, loc. cit.) and thus obtain more precise measurements of yields of α-tocopherol in conversion processes. In the examples illustrating the invention given below, α-tocopherol has been determined analytically by paper chromatography.

According to the process of the present invention for the conversion of non-α-tocopherols into products of enhanced vitamin E activity, particularly α-tocopherol, one or more of the aromatic hydrogen atoms in the 5, 7 and 8-positions of a non-α-tocopherol, or an ester or ether thereof, is replaced by an alkyl, aryl or aralkyl group, by reacting the tocopherol or ester or ether thereof with an aldehyde of the general formula RCHO where R is a hydrogen atom or an alkyl, aryl or aralkyl group in the presence of a compound of one of the general formulae $PX_5$, $POX_3$, $SO_2X_2$ and $XSO_3H$, where X is chlorine or bromine, to give a compound or compounds containing substituted alkyl, aryl or aralkyl groups capable of conversion to alkyl, aryl or aralkyl groups and then converting said groups to alkyl, aryl or aralkyl groups, The compounds of the aforesaid general formulae are phosphorous pentachloride, phosphorous oxychloride, sulphuryl chloride and chlorosulphonic acid, and the analogous bromine compounds. The compounds in this group are all powerful halogenating agents and are compounds of phosphorus or sulphur, in which the latter elements exist in their higher valency state. The intermediate substituted alkyl, aryl or aralkyl groups, which are introduced into the non-α-tocopherols or their esters or ethers in the vacant 5, 7 and/or 8-positions, may be halo-alkyl, halo-aryl or halo-aralkyl groups; or alternatively, depending on the mechanism of the reaction, alkyl, aryl or aralkyl groups containing complex phosphorus-containing or sulphur-containing radicals which can be converted, for example by immediate hydrolysis on addition of an aqueous liquid such as water, to hydroxyalkyl, hydroxy-aryl or hydroxy-aralkyl groups. These halogen- or hydroxyl-substituted groups can all be subsequently reduced to alkyl, aryl or aralkyl groups by numerous methods of reduction known in the art, such as the Clemensen reduction, or catalytic hydrogenation. In the case of methyl groups, formaldehyde or a compound (such as paraformaldehyde, chloromethyl ether, trioxane) capable of yielding formaldehyde under the conditions of reaction, is used as the aldehyde and the introduced substituted groups or their products of hydrolysis are subsequently reduced. By these means non-α-tocopherols are converted to α-tocopherols and other tocopherols of enhanced biological activity in a rapid, facile manner, in very high yield. It is noteworthy that the processes are quite distinct from previously known methods of haloalkylation in that reaction occurs in a dry, inert, substantially neutral system, free from halogen halide. This does not mean that hydrogen halide must be exluded from the reaction. On the contrary, the reaction proceeds satisfactorily in the presence of halogen halide. In these processes, however, halogen halide is not necessary for the haloalkylation to proceed. A further advantage of the present invention is that substitution in the tocopherol aromatic nucleus may take place in almost quantitative yield in the presence of as little as one equivalent of the phosphorus or sulphur halogen compound; in the case of phosphorous pentachloride, therefore, only one-fifth of a mol. of halogen compound is necessary for each mol. of tocopherol. This is in marked contrast to conventional methods of alkylation where very large molar excesses of halogen halide are necessary.

The process of the present invention may conveniently be carried out by treating 1 to 50% by weight solution of one mol. of the tocopherol or tocopherol mixture in an inert solvent with 1 to 6 mols. of the appropriate aldehyde and then adding a halogen compound of one of the general formulae specified above. Although reaction proceeds in the presence of a small amount of halogen compound, at least one equivalent is necessary for complete reaction to ensue and it may be necessary to add one or even more mols. excess of halogen compound for optimum results. Solvents which may be used include diethyl ether, isopropyl ether, higher ethers, hydrocarbons such as light petroleum, hexane, decahydronaphthalene or even benzene, and inert acids such as glacial acetic acid. Temperatures from 0°–60° C. have been used and are not critical. Times of reaction may be adjusted within very wide limits, being dependent upon concentration of reagents, temperature, excess of halogen compound, aldehyde used, etc. Times of reaction between two minutes and twenty-four hours have been used. An advantage of the reaction conditions is that prolonged reaction times do not affect the yield of required product, owing to the dry and inert nature of the system, whereas with previously known methods, great attention had to be paid to the time and temperature of reaction owing to the reactive nature of the system.

For the conversion of non-α-tocopherols to α-tocopherols, a 5 to 20% solution of the tocopherols is preferably prepared in ethereal solutions and 1 to 6 equivalents of phosphorous oxychloride or oxybromide is added. Paraformaldehyde (2 to 6 mols.) is then added and the closed system is shaken or stirred for several hours. Alternatively, dry formaldehyde gas may be used, and the reaction time may be shortened by use of an elevated temperature.

In ordinary practice, the tocopherols to be converted to α-tocopherols are present in a mixture and such a mixture may additionally contain non-tocopherol material. Providing sufficient reagents are added, yields of α-tocopherol are not materially affected by the presence of other substances.

The following examples illustrate the invention:

*Example 1*

γ-Tocopherol (1.0 g.) was dissolved in dry ether (10 ml.) and phosphorous oxychloride (0.13 g.) and dry paraformaldehyde (0.30 g.) were added. The flask was closed and the contents shaken for sixteen hours. At the end of this time, the product was reduced directly by the addition of zinc and hydrochloric acid over one hour. The ethereal extract was washed to neutrality with water, dried and evaporated to yield 1.0 g. of a pale yellow oil. Paper chromatographic analysis showed this to be 96% α-tocopherol, completely free from starting material.

*Example 2*

Zeta-tocopherol (1.07 g.) was dissolved in isopropyl ether (20 ml.) and phosphorous oxychloride (0.5 ml.) and paraformaldehyde (0.8 g.) were added. The flask was closed and the contents shaken for sixteen hours. After reduction and subsequent working up as in Example 1, 1.10 g. of a pale yellow oil was obtained (α-tocopherol 48%, zeta-tocopherol 28%).

*Example 3*

To a solution of 10 g. of a wheat-germ oil concentrate (total tocopherols 23%; approximately 55% α-tocopherol, 45% β- and ε-tocopherols) in 100 ml. of isopropyl ether were added phosphorous oxychloride (1 ml.) and paraformaldehyde (1.2 g.). The reaction was stirred for sixteen hours and then reduction was carried out with zinc and hydrochloric acid. Subsequent working up as in Example 1 gave an oil (9.7 g.; total tocopherols 21%; α-tocopherol proportion 95%, zeta-tocopherol proportion 5%).

*Example 4*

To a solution of 0.5 g. of a rice-oil concentrate containing alpha-, zeta- and eta-tocopherols (approximate proportions 46%, 26% and 27% respectively), in 10 ml. of isophopyl ether, were added phosphorous oxychloride (0.03 ml.) and paraformaldehyde (0.02 g.). The mixture was stirred for sixteen hours, and then reduced and worked up as in Example 1. Recovery of total tocopherols was 85%, which consisted entirely of α-tocopherol.

*Example 5*

To a solution of 1.21 g. of a soybean oil concentrate (total tocopherols 65%; 13% α-, 60% γ-, 27% δ-tocopherols), in 30 mls. of dry ether saturated with formaldehyde gas was added 0.48 g. of phosphorous pentachloride. After standing for 20 hours, the solution was reduced as in Example 1, by the Clemmensen reduction. Subsequent working up gave 1.22 g. of an orange oil (α-tocopherol, potency 59%, yield 89%).

*Example 6*

To a solution of 1.02 g. of a soybean oil concentrate (total tocopherols 53%, 13% α-, 60% γ-, 27% δ-tocopherols) in 10 mls. isopropyl ether were added phosphorous pentabromide (0.5 g.) and paraformaldehyde (0.15 g.). The mixture was stirred for six hours. At the end of this time, the ethereal solution was washed three times with water, dried and evaporated at a low temperature. The reddish oil left was dissolved in 10 mls. of dry ethanol and reduced with hydrogen over 10% palladium on charcoal catalyst. The catalyst was filtered off and the alcohol evaporated to dryness, to yield a pale yellow oil (1.04 g., containing 42.4% α-tocopherol).

*Example 7*

Example 6 was repeated, except that phosphorous oxybromide was used instead of phosphorous pentabromide. The resulting concentrate contained 47.4% α-tocopherol, a yield of 90%.

*Example 8*

To a solution of 1.8 g. of a soybean oil concentrate (as used in Example 6) in 10 ml. of isopropyl ether were added chlorosulphonic acid (0.3 g.) and paraformaldehyde (0.25 g.). The mixture was stirred for ten hours and then reduced and worked up as in Example 1. The product weighed 1.74 g. and had an α-tocopherol potency of 28%.

*Example 9*

Example 8 was repeated using sulphuryl chloride instead of chlorosulphonic acid. The final product had an α-tocopherol potency of 31%.

*Example 10*

To a solution of 0.51 g. of a soybean oil concentrate (60% total tocopherols; α, γ, δ proportions as in Example 6), in light petroleum (B.P. 80–100° C., 8 mls.) were added phosphorous oxychloride (0.1 ml.) and paraformaldehyde (0.09 g.). The mixture was shaken in a closed flask for sixteen hours and then reduced with zinc and hydrochloric acid and worked up as before. The product (0.52 g.) had an α-tocopherol potency of 34%.

*Example 11*

Repetition of Example 10, using glacial acetic acid as solvent gave a 30% α-tocopherol concentrate with a 60% overall yield of α-tocopherol.

*Example 12*

Repetition of Example 10, using decahydronaphthalene as solvent, gave a 30% α-tocopherol concentrate in 55% overall yield.

*Example 13*

Repetition of Example 10, using benzene as solvent, gave a final concentrate of enhanced α-tocopherol potency.

*Example 14*

To a solution of 3.8 g. of a soybean oil concentrate (total tocopherols 53%; α, γ, δ-tocopherol proportions as in Example 6) in isopropyl ether (20 mls.) were added phosphorous pentachloride (1.1 g.) and paraformaldehyde (0.55 g.). The mixture was heated under reflux for thirty minutes, then cooled, reduced with zinc and hydrochloric acid and worked up as before. The product (3.7 g.) was a yellow viscous oil, and had an α-tocopherol concentration of 44%.

*Example 15*

4.8 g. of the soybean oil concentrate as used in Example 14 were dissolved in ether (50 ml.) and the solution cooled to 10° C. Phosphorous pentachloride (2.1 g.) was then added and then, dropwise, 1.25 ml. of 37% aqueous formaldehyde solution. The mixture was allowed to stand for three hours and then directly reduced by the addition of zinc and hydrochloric acid. The product, after working up as before, weighed 4.8 g. and had an α-tocopherol concentration of 43%.

*Example 16*

To a solution of 0.64 g. of a soybean oil concentrate (total tocopherols 57%; proportions of α, γ, δ-tocopherols as in Example 6) in 10 ml. of isopropyl ether were added phosphorus oxychloride (0.1 ml.) and acetaldehyde (0.2 ml.). The mixture was stirred for sixteen hours and reduced directly with zinc and hydrochloric acid. The product, after working up as before, was a yellow oil which was analysed by two-dimensional paper chromatography, using 85% ethanol as to the mobile phase (instead of 75% ethanol) because of the greater lyophilic nature of ethyl-substituted tocopherols. Using the methods of analysis outlined by Green and Marcinkiewicz (Nature, 1955, 176, 1172), it was found that the product had a total tocopherol potency of 38.2%, consisting of α-tocopherol (11.4%), 7.8-dimethyl-5-ethyltocol (12.2%) and 5-ethyl-8-methyltocol (14.6%).

*Example 17*

A repetition of Example 16, using benzaldehyde (in equimolecular amount) instead of acetaldehyde gave a product which assayed as follows: Total tocopherols, 42.8%; (α-tocopherol 8.0%, 7.8-dimethyl-5-benzyltocol 27.7% and 5-benzyl-8-methyltocol 7.1%).

*Example 18*

10 g. of a 60% tocopherol concentrate from soybean oil was acetylated with acetic anhydride and sodium acetate. The acetylated concentrate was dissolved in isopropyl ether (150 mls.) and paraformaldehyde (2.0 g.) and phosphorus oxychloride (4 mls.) added. The mixture was refluxed for two hours and then reduced directly with zinc and hydrochloric acid. The product, a dark red oil, was saponified to yield the free tocopherol concentrate. Analysis by two-dimensional chromatography showed it to contain 20% α-tocopherol.

*Example 19*

1 g. of a 53% total tocopherol concentrate from soybean oil (tocopherol proportion as in Example 6) was mixed with 1 ml. of dihydropyran and a trace of hydrochloric acid. After standing for three days, caustic soda was added to neutralise the acid and the organic material was extracted with ether. Evaporation of the ether yielded a yellow oil, free from reducing power, and consisting of a concentrate of the mixed dihydropyran ethers of α-, γ- and δ-tocopherols. The concentrate was dissolved in ether (10 mls.) and paraformaldehyde (0.15 g.) and phosphorous oxychloride (0.18 ml.) added. The mixture was stirred for sixteen hours and then the ethereal solution was washed three times with water, dried and evaporated to dryness. The dark oil remaining showed only traces of reducing activity, demonstrating that the dihydropyran ethers had not been subjected to cleavage to free tocopherols during the reaction. The oil was dissolved in ethyl alcohol and reduced with hydrogen over a 10% palladium on charcoal catalyst. Working up gave an oil which was cleaved by refluxing for two hours with aqueous-ethanolic hydrochloric acid. Extraction with ether and working up as usual gave 1 g. of a yellow oil having an α-tocopherol potency of 26%.

What we claim is:

1. In a process for treating a tocopherol other than α-tocopherol to enhance the vitamin E activity of the treated tocopherol wherein at least one of the aromatic hydrogen atoms in the 5, 7 and 8 positions of the treated tocopherol is replaced by a member selected from the group consisting of lower alkyl and aralkyl groups through reaction with an aldehyde of the formula RHCO in which R is selected from the group consisting of hydrogen, lower alkyl, aryl and aralkyl to give at least one tocopherol containing a group which is subsequently converted to an unsubstituted radical selected from the group consisting of said lower alkyl, and aralkyl groups, the improvement which consists essentially of carrying out the reaction with the aldehyde in the presence of a halogenating agent selected from the group consisting of $PCl_5$, $PBr_5$, $POCl_3$, and $POBr_3$.

2. In a process for treating a tocopherol other than α-tocopherol to enhance the vitamin E activity of the treated tocopherol wherein at least one of the aromatic hydrogen atoms in the 5, 7 and 8 positions of the treated tocopherol is replaced by a member selected from the group consisting of lower alkyl, and aralkyl groups through reaction with an aldehyde of the formula RHCO in which R is selected from the group consisting of hydrogen, lower alkyl, aryl and aralkyl to give at least one tocopherol containing a group which is subsequently converted to an unsubstituted radical selected from the group consisting of said lower alkyl and aralkyl groups, the improvement which consists essentially of carrying out the reaction with the aldehyde in the presence of a halogenating agent selected from the group consisting of $PCl_5$, $PBr_5$, $POCl_3$, and $POBr_3$, in a dry, inert, substantially neutral system.

3. In a process for treating a tocopherol other than α-tocopherol to enhance the vitamin E activity of the treated tocopherol wherein at least one of the aromatic hydrogen atoms in the 5, 7 and 8 positions of the treated tocopherol is replaced by a member selected from the group consisting of lower alkyl, and aralkyl groups through reaction with an aldehyde of the formula RHCO in which R is selected from the group consisting of hydrogen, lower alkyl, aryl and aralkyl to give at least one tocopherol containing a group which is subsequently converted to an unsubstituted radical selected from the group consisting of said lower alkyl, and aralkyl groups, the improvement which consists essentially of carrying out the reaction with the aldehyde in the presence of a halogenating agent selected from the group consisting of $PCl_5$, $PBr_5$, $POCl_3$, and $POBr_3$ in a dry, inert, substantially neutral system free from hydrogen halide.

4. In a process for treating a tocopherol other than α-tocopherol to enhance the vitamin E activity of the treated tocopherol wherein at least one of the aromatic hydrogen atoms in the 5, 7 and 8 positions of the treated tocopherol is replaced by a member selected from the group consisting of lower alkyl, and aralkyl groups through reaction with an aldehyde of the formula RHCO in which R is selected from the group consisting of hydrogen, lower alkyl, aryl and aralkyl to give at least one tocopherol containing a group which is subsequently converted to an unsubstituted radical selected from the group consisting of said lower alkyl, and aralkyl groups, the improvement which consists essentially of carrying out the reaction with the aldehyde in the presence of at least one equivalent of a halogenating agent selected from the group consisting of $PCl_5$, $PBr_5$, $POCl_3$, and $POBr_3$.

References Cited in the file of this patent

UNITED STATES PATENTS

| | | |
|---|---|---|
| 2,486,539 | Weisler | Nov. 1, 1949 |
| 2,519,863 | Weisler | Aug. 22, 1950 |
| 2,630,459 | Raternick | Mar. 3, 1953 |